UNITED STATES PATENT OFFICE.

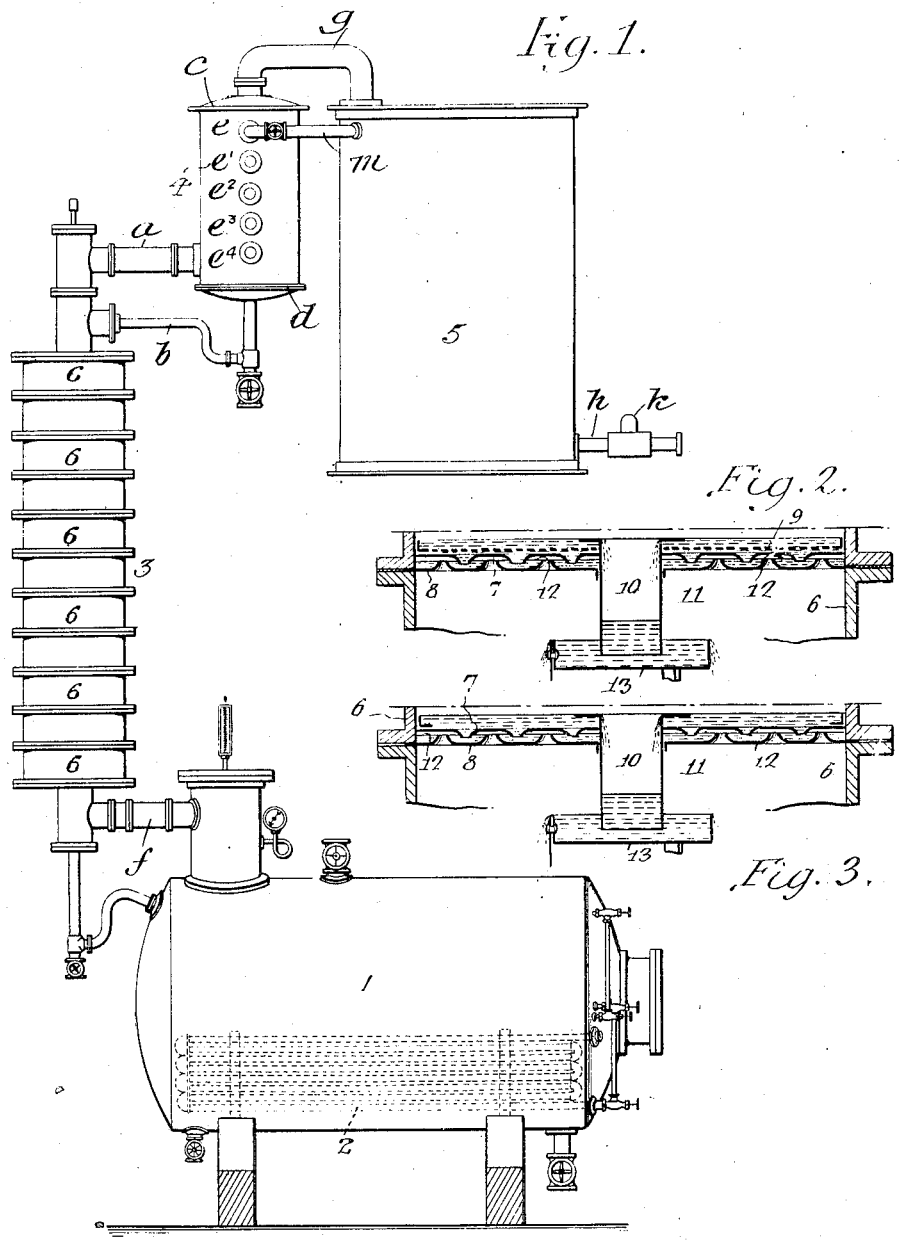

BENJAMIN F. BROOKE SEWELL, OF WASHINGTON, DISTRICT OF COLUMBIA.

APPARATUS FOR SCRUBBING OR SIMILARLY TREATING LIQUIDS AND GASES.

1,108,853.  Specification of Letters Patent.  Patented Aug. 25, 1914.

Application filed October 21, 1910. Serial No. 588,339.

*To all whom it may concern:*

Be it known that I, BENJAMIN F. BROOKE SEWELL, a subject of the King of Great Britain and Ireland and the Isle of Man, residing in Washington, District of Columbia, have invented an Improved Apparatus for Scrubbing or Similarly Treating Liquids and Gases, of which the following is a specification.

My invention relates to the art of scrubbing or similarly treating vaporous or gaseous bodies for the purpose of removing from the same various elements; which may be in both instances products condensable at various temperatures, and in either instance various impurities present in the vaporous or gaseous bodies undergoing treatment, and my invention comprises an apparatus which is peculiarly and particularly available for employment in the art of distilling liquids of various characters, turpentines, petroleums, alcohols, ammonia, etc., and any other liquid body which may be brought to the state of a gas or vapor, or for scrubbing vapors and gases for the purpose of purifying the same.

One object of my invention is to provide means for bringing vapors and gases from a turpentine still or other similar apparatus into intimate contact with liquid, part of which may be at rest and part in motion, for the purpose of rectifying the vapors or gases and to effect the desired removal or condensation of parts of the same prior to final condensation of the ultimate products which it is desired to obtain.

My invention is illustrated herewith as applied to a simple form of discontinuous still, but, as may be readily understood, it may be employed in connection with other forms of apparatus, for instance, continuous stills, gas scrubbers, and the like.

The features of my invention are more fully pointed out hereinafter, reference being had to the accompanying drawings, in which:

Figure 1, is a diagrammatic representation of a still and column with a usual form of condensing means, and Figs. 2 and 3 are sectional views illustrating column constructions embodying my invention.

The rectifying column employed in connection with my invention is preferably composed of a number of sections, and these sections contain means for causing a descending stream or streams of liquid from a suitable source, a reflux cooler for instance, to be brought into intimate contact with vaporous bodies or gases from any source, a suitable still for instance, ascending within said column. In the construction of these columns as ordinarily made, that is to say, in the arrangement of the contained plates or elements, two disadvantages have hitherto been met with. First: In constructions where the plates are of the perforated type, when for any reason such as lack of steam in the heating coils or carelessness on the part of the attendant, the amount of ascending vapors lessens or diminishes, a "discharge" of liquid may take place through the perforated plate; the ascending vapors no longer pass through the desired depth of liquid and the efficiency and effectiveness of the column decreases; or second: In constructions where the plates are the cup type, then, although less sensitive to fluctuation, such construction has much smaller capacity for the same area of column.

The principal object of my invention is to have a column of large capacity without materially increasing the size, and one whose efficiency can not be so much affected by fluctuations as in the type of column employing perforated plates. In other words, as compared with the largest forms of continuous stills where there is always a skilled attendant in charge, the improved style of column is entirely equal in efficiency, but in comparison with all others, for instance where the efficiency of the attendance may fall off, or for medium and smaller column stills, it is materially better than any heretofore in use.

In Fig. 1 of the drawings, 1 represents an ordinary form of still, containing heating means indicated at 2; such still being suitably connected with a suitable rectifying column indicated at 3. This column is connected with a suitable form of reflux cooler 4 in which part of the vapors coming from the column 3 are condensed; such vapors passing through a horizontal pipe *a*, while the products of condensation are returned to said rectifying column through the pipe *b*; such condensate being brought into intimate contact with the ascending vapors therein.

The operation of a partial condenser such as the reflux cooler 4 used for the purpose described, if of the usual design, is not easily regulable (for instance so as to cause it to condense a larger part of the vapors just before the products are changed than after), and easy regulation is desirable in order to get a large output with a good separation of the products.

My improved partial condenser of reflux cooler is especially arranged for easy regulation. It comprises a pair of tube plates $c$ and $d$ between which the tubes (not shown) are mounted. The water is kept at various heights around the tubes as may be desired by means of the various overflows indicated by the pipe flanges $e$, $e'$, $e^2$, $e^3$ and $e^4$, at the front of the condenser. Vapor passes from the still to the column 3 through the pipe $f$, and from the partial condenser 4 to the condenser 5 through pipe $g$, while the condensed product passes from the condenser 5 through the pipe $h$. At $k$ I have indicated a receptacle for a gravity meter, which is of assistance in determining the proper time to change from one product to another, and $m$ is a pipe through which cooling water passes from the condenser 5 to the partial condenser 4. This water fills around the tubes of the partial condenser up to the height of the open overflow; the condensing surface in the partial condenser varying in accordance with the height of the water, which height is determined by the overflow point.

In Fig. 1, I have shown the casing of a rectifying column or scrubber as made up of a plurality of annular sections 6 in which are contained the improved elements providing for the passage of vapor and liquid; which elements are supported and maintained in spaced relation by said sections 6.

Figs. 2 and 3 are sectional views illustrating the construction of the elements contained in the sections 6. In these structures a liquid seal is formed by a plurality of perforated plates, preferably two, indicated at 7 and 8, the perforations being formed in such manner that the edges of the holes are raised at one side of the plate; the perforations, of course, being staggered, and the raised portions disposed toward each other. In the arrangement shown in Fig. 2, I may employ an additional foraminous plate of wire gauze or perforated metal above the stamped plates, as indicated at 9, or the perforations with the raised edges may be so small that an upper plate may be found to be unnecessary, as indicated in Fig. 3. The lower plate forms a part of the liquid seal through which the bubbles of vapor or gas force their way, the excess of liquid overflowing and passing down through a central tube 10. As noted, the plates 7 may be carried by the sections 6, while the plates 8 may be of such diameter as to be held between the flanges of the said sections.

Before the column is started in regular operation the several pans are to be filled with liquid. It is understood that the capacity of each pan is such that the pressure of the vapor or gas on the surface of the liquid in the pan will cause the liquid to overflow and fill the communicating tubes 10 between the pans before the liquid gets so low in any pan that the vapor or gas could force its way into and bubble up through any of said tubes, and that the pressure will maintain the liquid seals in the manner indicated. In this construction, vapors ascending from the still pass into the interior space or chamber 11 of the column, force their way through the liquid seal provided in the pan formed by the plate 7, and bubble up through a body of liquid 12 (such liquid being that which may be returned from the reflux condenser and composed in part of condensed vapor). It is clear that as the vapors are forcing down the level of the liquid underneath the plate 8 to such an extent that the vapors pass through the liquid seal, no liquid can at the same time pass in the opposite direction through the same liquid seal. In the form of structure shown in Fig. 2, the bubbles of vapor or gas pass upward through said liquid body 12 to a foraminous plate 9 submerged in said liquid, which plate may be so proportioned that the apertured portion of the same is sufficient for the passage of all the vapors produced by the stills when the column is operating at its maximum capacity. In the form of structure shown in Fig. 3, this foraminous plate is omitted. When operating at a very low capacity, the vapors may only pass through a limited area of the plate, but they do traverse the whole depth of liquid. In this operation, however, there is no "discharge" such as would take place in the ordinary form of column made up of foraminous plates of the perforated type assembled in the usual way.

It is much preferred that the plates be kept submerged in the liquid, a condition that may be readily provided for in the constructions illustrated in Figs. 2 and 3, but in certain cases the splashes from above and below the foraminous plates may be relied upon to keep the same sufficiently wet; that is to say, with a sufficient layer of liquid upon said plate or plates through which the ascending vapors or gases must pass.

As already stated, the liquid from the reflux cooler (or any other liquid of suitable composition and temperature) falls into a space 11 between the condensing elements, covers the foraminous plates (8 or 9, as the case may be) through which the vapors are forcing their way, and overflows into a tube 10, from which it may pass into a cup 13 or into any other suitable means forming a liquid seal for said tube, overflowing again through said liquid seal into another space 10, and from this space it falls onto another foraminous plate, again overflowing into a tube 10, and so on. The vapors after passing through the apertures or perforations in the several foraminous plates continue on in the form of very small bubbles through the bodies of liquid above said plates and into the several spaces 11 throughout the column.

In my improved construction, as illustrated in Fig. 2, the apertured plate serves the purpose of distributing the bubbles of vapor substantially over the whole area of the column; that is to say, over the whole area of the column except such as may be taken up by the tubes 10 which convey the descending bodies of liquid and, (in certain cases), the area which may be taken up by the ascending vapors, while the gauze provides for a more intimate contact by breaking up the bubbles, thereby decreasing their size; in other words increasing the area and duration of contact between the vapor and liquid. But the gauze may be of such an open mesh that the liquid will have no difficulty in passing through it, even when the maximum amount of vapor is ascending. This compound operation, i. e., utilizing one plate for distribution of the bubbles and the other to cause intimate contact therewith may be applied to any suitable form of plate column, &c. It enables the area of the holes in a plate to be made smaller for the same capacity of apparatus, making the column more flexible by lowering the minimum capacity at which a discharge would commence. The holes may be made of a smaller total area because, in spite of the greater velocity of the vapors through the smaller holes, the gauze above insures proper contact, as already explained. In all cases, the principle is the same; the ascending vapors pass in the form of bubbles through the liquid and strike the foraminous plates where the bubbles are distributed, so that practically the whole area of the column is utilized as a reaction surface. By passing the vapor through the smaller apertures in the foraminous plates, they may be spread over as large an area of the column as may be necessary for proper fractionating effect.

It is also clear that the constructions forming the subject of my invention provide for a very intimate contact of the liquid and vapors; the liquid descending and the vapor ascending, and that there will be no loss of efficiency due to fluctuations in the amount of vapor ascending. The compound plate shown also produces increased efficiency.

I claim:

1. In apparatus for the treatment of gases or vapor by means of liquids flowing countercurrent to the direction of movement of said gases or vapors, means for maintaining layers of liquid of suitable depth disposed at intervals throughout the apparatus, said means comprising a pair of perforated burred plates arranged in parallel opposing relation and with the burs of one plate projecting toward those of the other plate, and in staggered relation thereto to form a liquid seal.

2. In a fractionating column, the combination with a plurality of sections suitably connected together, of pan-like elements carried by said sections supporting bodies of liquid, said elements comprising a pair of horizontal, opposed perforated plates having burs surrounding the perforations, the burs of one plate extending toward those of the other plate and projecting into the spaces between adjacent burs of said other plate to form a liquid seal.

3. In a fractionating column, the combination with a plurality of sections suitably connected together, of pan-like elements carried by said sections supporting bodies of liquid, said elements comprising a pair of horizontal, opposed perforated plates having burs surrounding the perforations, the burs of one plate extending toward those of the other plate and projecting into the spaces between adjacent burs of said other plate to form a liquid seal, and a foraminous plate submerged within said liquid for distributing over a large liquid reaction area the vapor bubbles passing said liquid seal.

In testimony whereof, I have signed my name to this specification, in the presence of two subscribing witnesses.

BENJAMIN F. BROOKE SEWELL.

Witnesses:
MURRAY C. BOYER,
WM. A. BARR.